(12) United States Patent
Gardner et al.

(10) Patent No.: US 7,158,446 B2
(45) Date of Patent: Jan. 2, 2007

(54) DIRECTIONAL ACOUSTIC TELEMETRY RECEIVER

(75) Inventors: Wallace R. Gardner, Houston, TX (US); Sinan Sinanovic, Sarajevo (BA); Don Herrick Johnson, Houston, TX (US); Vimal V. Shah, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/897,559

(22) Filed: Jul. 23, 2004

(65) Prior Publication Data

US 2005/0024232 A1 Feb. 3, 2005

Related U.S. Application Data

(60) Provisional application No. 60/513,679, filed on Oct. 23, 2003, provisional application No. 60/490,662, filed on Jul. 28, 2003.

(51) Int. Cl.
*H04H 9/00* (2006.01)

(52) U.S. Cl. .................. 367/81; 340/854.3; 340/854.4

(58) Field of Classification Search ................ 367/81, 367/25, 38, 56; 340/855.5, 855.6, 854.3, 340/854.4; 181/102
See application file for complete search history.

(56) References Cited

U.S. PATENT DOCUMENTS

| | | | |
|---|---|---|---|
| 2,810,546 A | 10/1957 | Eaton et al. | |
| 3,588,804 A | 6/1971 | Fort | |
| 3,716,830 A * | 2/1973 | Garcia | 367/83 |
| 3,747,059 A * | 7/1973 | Garcia | 367/83 |
| 3,790,930 A | 2/1974 | Lamel et al. | |
| 3,813,656 A | 5/1974 | Fowler | |
| 4,282,588 A | 8/1981 | Chanson et al. | |
| 4,283,779 A | 8/1981 | Lamel | |
| 4,302,826 A | 11/1981 | Kent et al. | |
| 4,314,365 A | 2/1982 | Petersen et al. | |
| 4,590,593 A * | 5/1986 | Rodney | 367/83 |
| 5,467,320 A * | 11/1995 | Maki, Jr. | 367/40 |
| 5,969,638 A * | 10/1999 | Chin | 340/855.3 |
| 6,006,832 A * | 12/1999 | Tubel et al. | 166/250.01 |
| 6,088,294 A * | 7/2000 | Leggett et al. | 367/25 |
| 6,320,820 B1 | 11/2001 | Gardner et al. | |
| 6,370,082 B1 | 4/2002 | Gardner et al. | |
| 6,583,729 B1 | 6/2003 | Gardner et al. | |
| 6,837,332 B1 * | 1/2005 | Rodney | 181/105 |
| 2004/0156264 A1 | 8/2004 | Gardner et al. | |

(Continued)

OTHER PUBLICATIONS

Proakis, John G., Second Edition Digital Communications, McGraw-Hill Book Company, New York, 1989, Chapter 6, pp. 519-692.

(Continued)

*Primary Examiner*—Timothy Edwards, Jr.
(74) *Attorney, Agent, or Firm*—Conley Rose, P.C.

(57) ABSTRACT

Acoustic telemetry devices and methods that provide directional detection. In one embodiment, a disclosed acoustic telemetry device comprises at least two acoustic sensors and an electronics module. A first of the acoustic sensors detects a communication signal that propagates along a tubing string in a first direction. A second of the acoustic sensors is configured to detect the communication signal before the first acoustic sensor. The electronics module combines the detection signals from the acoustic sensors to obtain a combined signal that substantially excludes signals propagating in a direction opposite to the communication signal. Such signal suppression may significantly enhance the communication signal's signal-to-noise ratio, thereby increasing channel capacity. The acoustic telemetry device may be configured to support logging while drilling and/or full-duplex communication.

14 Claims, 3 Drawing Sheets

U.S. PATENT DOCUMENTS

2004/0206170 A1   10/2004   Gardner et al.

OTHER PUBLICATIONS

Smith, Julius O., Physical Audio Signal Processing: Digital Waveguide Modeling of Musical Instruments and Audio Effects, Aug. 2004 Draft, Center for Computer Research in Music and Acoustics (CCRMA), Stanford University, Web published at ttp://ccma.stanford.edu/~jos/pasp04/, 5 pages.

Valimaki, Vesa, Discrete-Time Modeling of Acoustic Tubes Using Fractional Delay Filters, PhD thesis, Report No. 37, Helsinki University of Technology, Espoo, Finland, Dec. 1995, 194 pages.

* cited by examiner

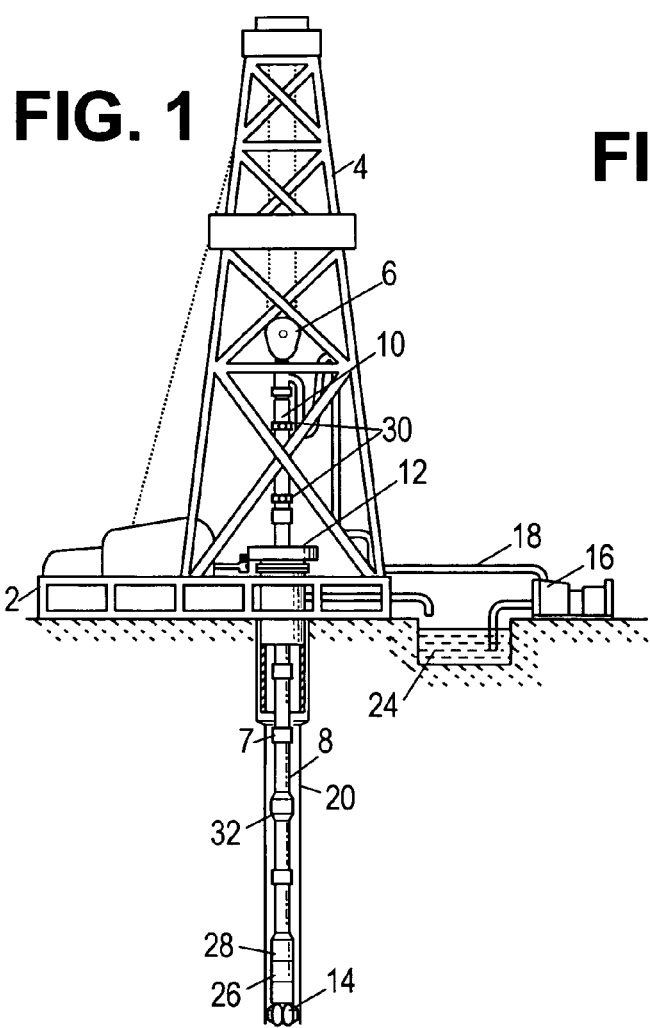
FIG. 1
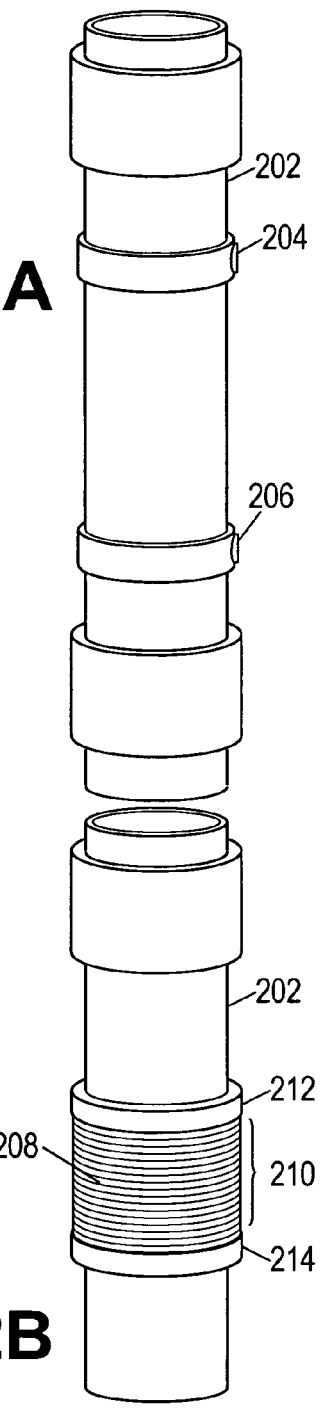
FIG. 2A
FIG. 2B

DIRECTIONAL ACOUSTIC TELEMETRY RECEIVER

CROSS-REFERENCE TO RELATED APPLICATIONS

This application claims priority to the following provisional patent applications, each of which is hereby incorporated herein by reference:

Provisional U.S. Patent Application No. 60/490,662, entitled "Drilling Telemetry", filed Jul. 28, 2003; and Provisional U.S. Patent Application No. 60/513,679, entitled "Acoustic Telemetry Receiver Array", filed Oct. 23, 2003.

This application also relates to the following patent applications and patents, each of which is hereby incorporated herein by reference:

U.S. Pat. No. 6,370,082, entitled "Acoustic Telemetry System With Drilling Noise Cancellation", issued Apr. 9, 2002;

U.S. Pat. No. 6,583,729, entitled "High Data Rate Acoustic Telemetry System Using Multipulse Block Signaling With a Minimum Distance Receiver", issued Jun. 24, 2003;

U.S. patent application Ser. No. 10/364,169, entitled "Downhole Telemetry System Using Discrete Multi-Tone Modulation in a Wireless Communication Medium", filed Feb. 10, 2003; and U.S. patent application Ser. No. 10/413,837, entitled "Method and Apparatus for Detecting Torsional Vibration With a Downhole Pressure Sensor", filed Apr. 15, 2003.

BACKGROUND

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" that houses formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other downhole parameters, such as the temperature and the pressure at the base of the borehole, for example. Once this data is gathered at the bottom of the borehole, it is necessary to communicate it to the surface for use and analysis by the driller.

In MWD systems, sensors or transducers are typically located at the lower end of the drill string. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline tool. Of these, the mud pulse system is one of the most widely used telemetry systems for MWD applications.

The mud pulse telemetry system creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is typically less than 10 pulses per second (10 Hz).

Given the recent developments in sensing and steering technologies available to the driller, the amount of data that can be conveyed to the surface in a timely manner a few bits per second is sorely inadequate. As one method for increasing the rate of transmission of data, it has been proposed to transmit the data using compressional acoustic waves in the tubing wall of the drill string rather than depending on pressure pulses in the drilling fluid. Many physical constraints present challenges for this type of telemetry. Acoustic wave propagation through the drill string encounters attenuation and scattering due to the acoustic impedance mismatch at pipe joints. The resulting transfer function is lossy and has alternating stop and pass bands. In-band noise produced by the bit and surface motor(s) produces a low signal-to-noise ratio. Typically, the downhole transmitter has significant power constraints. It would be desirable to have ways to improve acoustic telemetry system performance in the face of the obstacles.

SUMMARY

Accordingly, there is disclosed herein various acoustic telemetry devices and methods that provide directional detection. In one embodiment, a disclosed acoustic telemetry device comprises at least two acoustic sensors and an electronics module. A first of the acoustic sensors detects a communication signal that propagates along a tubing string in a first direction. A second of the acoustic sensors is configured to detect the communication signal before the first acoustic sensor. The electronics module combines the detection signals from the acoustic sensors to obtain a combined signal that substantially excludes signals propagating in a direction opposite to the communication signal. Such signal suppression may significantly enhance the communication signal's signal-to-noise ratio, thereby increasing channel capacity. The acoustic telemetry device may be configured to support logging while drilling and/or full-duplex communication.

BRIEF DESCRIPTION OF THE DRAWINGS

A better understanding of the disclosed embodiments can be obtained when the following detailed description is considered in conjunction with the following drawings, in which:

FIG. 1 is a schematic view of an oil well in which an acoustic telemetry system may be employed;

FIG. 2A is a view of an illustrative acoustic receiver;

FIG. 2B is a view of an illustrative acoustic transmitter;

Figure 3:
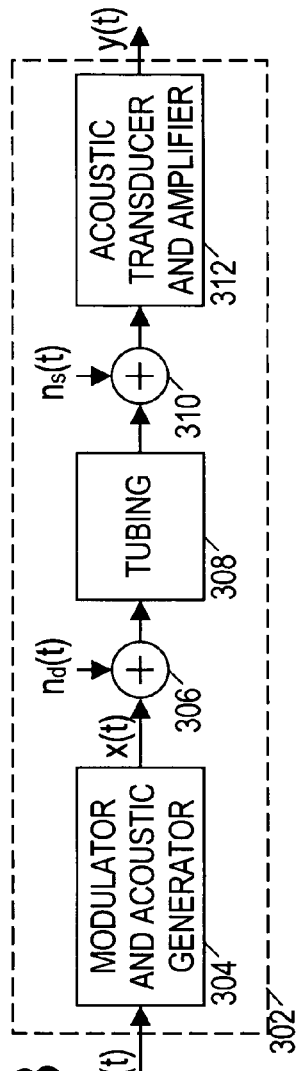
FIG. 3 is a block diagram of a first acoustic telemetry model.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed "mud", is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In wells employing acoustic telemetry for MWD, downhole sensors 26 are coupled to an acoustic telemetry transmitter 28 that transmits telemetry signals in the form of acoustic vibrations in the tubing wall of drill string 8. An acoustic telemetry receiver array 30 may be coupled to the kelly 10 to receive transmitted telemetry signals. One or more repeater modules 32 may be provided along the drill string to receive and retransmit the telemetry signals. The repeater modules 32 include both an acoustic telemetry receiver array and an acoustic telemetry transmitter configured similarly to receiver array 30 and the transmitter 28.

FIG. 2A shows an illustrative receiver array mounted on a drill string 202. The receiver array includes at least two acoustic sensors 204, 206, spaced apart along the axis of the drill string 202. Various suitable acoustic sensors are known in the art including pressure, velocity, and acceleration sensors. Sensors 204 and 206 may comprise two-axis accelerometers that sense accelerations along the axial and circumferential directions. One skilled in the art will readily recognize that other sensor configurations are also possible. For example, sensors 204 and 206 may comprise three-axis accelerometers that also detect acceleration in the radial direction.

Additional sensors may be provided 90 or 180 degrees away from the sensors shown. A reason for employing such additional sensors stems from an improved ability to isolate and detect a single acoustic wave propagation mode to the exclusion of other propagation modes. Thus, for example, a multi-sensor configuration may exhibit improved detection of axial compression waves to the exclusion of torsional waves, and conversely, may exhibit improved detection of torsional waves to the exclusion of axial compression waves. U.S. Pat. No. 6,370,082 entitled "Acoustic Telemetry System With Drilling Noise Cancellation" discusses one such sensor configuration.

Additional sensors may be spaced axially along the drill string 202. As explained further below, one reason for employing multiple, axially spaced sensors stems from an ability to screen out surface noise and improve the signal to noise ratio of the receive signal. Larger axial spacings within physical system constraints may be preferred. Another consideration, at least when tone burst signaling is employed, is the axial placement of the sensors relative to the end of the tool string. U.S. Pat. No. 6,320,820, entitled "High data rate acoustic telemetry system" discusses a sensor placement strategy for such systems.

FIG. 2B shows an acoustic transmitter 208 mounted on drill string 202. Various suitable acoustic transmitters are known in the art, as evidenced by U.S. Pat. Nos. 2,810,546, 3,588,804, 3,790,930, 3,813,656, 4,282,588, 4,283,779, 4,302,826, and 4,314,365. The transmitter 208 shown in FIG. 2B has a stack of piezoelectric washers 210 sandwiched between two metal flanges 212, 214. When the stack of piezoelectric washers 210 is driven electrically, the stack expands and contracts to produce axial compression waves that propagate axially along the drill string. Other transmitter configurations may be used to produce torsional waves, radial compression waves, or even transverse waves that propagate along the drill string.

FIG. 3 shows a model 302 of an acoustic telemetry system with a single acoustic sensor. A digital or analog telemetry signal u(t) is modulated and converted to an acoustic wave signal x(t) by modulator block 304. Adder 306 adds downhole noise $n_d(t)$ to the acoustic wave signal x(t). The downhole noise is caused in part by the operation of the drill bit as it crushes formation material. The crushing action creates compressional and torsional acoustic waves that propagate along the drill string in the same manner as the acoustic telemetry signal x(t).

The propagation of the noise-contaminated telemetry signal through the drillstring is represented by block 308. Because the drill string consists of many pipe segments, compressional acoustic waves partly reflect at the acoustic impedance mismatches caused by the pipe joints. The periodic structure of the drill string results in a frequency response which has multiple stopbands and passbands.

Adder 310 adds surface noise ns(t) to the acoustic signal that reaches the surface. The surface noise is caused at least in part by the drive motor(s) at the surface. The resulting acoustic signal is converted a digital or analog receive signal y(t) by an acoustic transducer and amplifier block 312.

The capacity for the uplink channel can be derived for the model of FIG. 3. The following notation is used: X(f) denotes the power spectral density (PSD) of the telemetry signal, Nd(f) denotes the PSD of the downhole noise, Ns(f) represents the PSD of the surface noise, and H(f) represents the frequency response (the transfer function) of the drill string. For a typical drill string length of a few thousand feet, the magnitude of the transfer function is generally much less than one, with many passbands and stopbands. The attenuation is severe even in the passbands, and increases with the length of the drill string. For the present analysis, the downhole and surface noise sources are assumed to be additive and Gaussian. Further assuming that the power of the telemetry signal is power constrained, i.e., that the average transmit power is constrained so that $E[x^2(t)]=P$, let X(f) denote the input power spectrum that meets this constraint $(P=\int X(f)df)$. The expression for the uplink capacity over the frequency band B is given by:

$$C_{UL} = \int_B \log_2\left(1 + \frac{X(f)}{N_b(f) + N_S(f)|H(f)|^{-2}}\right)df \text{ bits/s} \quad (1)$$

For a given bandwidth B, the capacity depends on the SNR-like quantity inside the logarithm. The denominator inside the logarithm shows that the surface noise is, in effect, greatly amplified by $|H(f)|^{-2}$ because $|H(f)|^{-2} \gg 1$. Therefore, if the $N_b(f)$ and $N_s(f)$ are of the same order of magnitude, the capacity formula shows that the dominant noise component in the capacity formula is the surface noise because of the amplification factor $|H(f)|^{-2}$. Taking into account currently available power and bandwidth limitations, an uplink capacity on the order of 1000 bits/sec can be reached for a drill string approximately 2 km in length. The downlink capacity is similar to equation (1).

Considering the fact that the bandwidth, the channel, the signal power and the noise sources are given, one can mistakenly assume that nothing can be done to improve the capacity of the uplink channel. However, we demonstrate here that the use of multiple receivers allows for substantial noise reduction, and that under the right conditions, two receivers can be used to completely remove the surface noise. The key idea is to take advantage of the fact that compressional acoustic waves travel in two directions inside the drill string. The use of multiple receivers allows downward-propagating waves (such as surface noise) to be distinguished from upward-propagating waves (such as the telemetry signals). The use of two or more receivers allows the downwardly-propagating waves to be suppressed, substantially enhancing the signal to noise ratio of the telemetry signal. As will be shown, however, the appropriate processing of signals from the two receivers may even allow the surface noise signal to be identified and completely suppressed. Sampling and quantization, however, may introduce errors in the directional signal enhancement.

Figure 4:
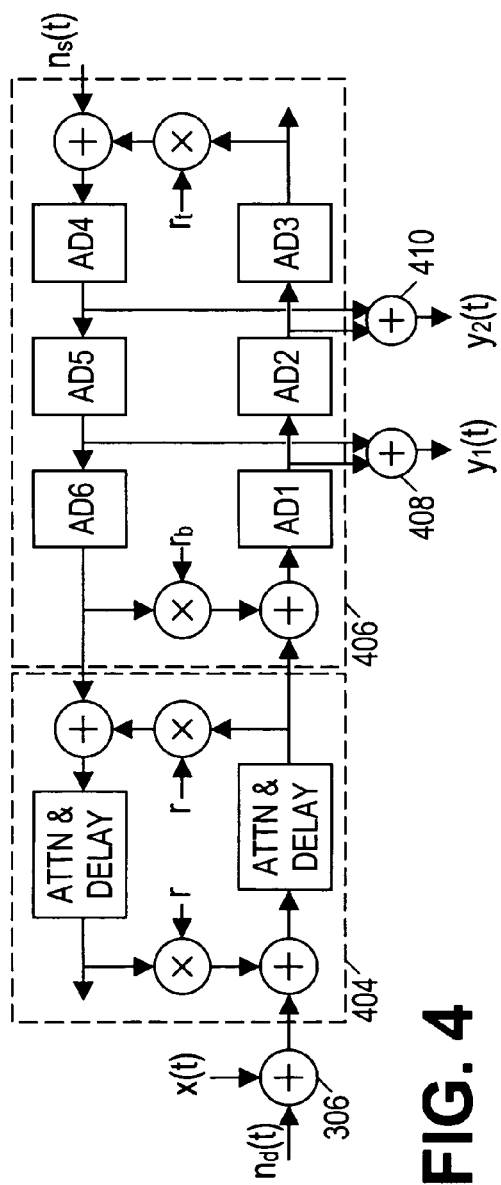
FIG. 4 is a block diagram of a second model for a multi-receiver acoustic telemetry system.

FIG. 4 shows a more detailed model of an acoustic telemetry system with multiple receivers. An adder 306 contaminates the acoustic telemetry signal x(t) with downhole noise $n_d(t)$. One or more tubing segment blocks 404 transport the acoustic waves in two directions, introducing attenuation, delays, and reflections from the ends of each tubing segment. Eventually, the upwardly-propagating acoustic waves reach a receiver tubing segment 406. The receiver tubing segment 406 also receives downwardly-propagating surface noise $n_s(t)$. The receiver tubing segment 406 includes at least two receivers. A first receiver, represented by adder 408, is sensitive to acoustic waves propagating in both directions. Similarly, a second receiver is represented by an adder 410 that is sensitive to acoustic waves propagating in both directions. The receivers are separated by attenuation and delay blocks AD2 (in the upward direction) and AD5 (in the downward direction). The attenuation and delay of these blocks may be equivalent. The receivers may or may not be separated from the ends of the tubing segment by other attenuation and delay blocks.

Figure 5:
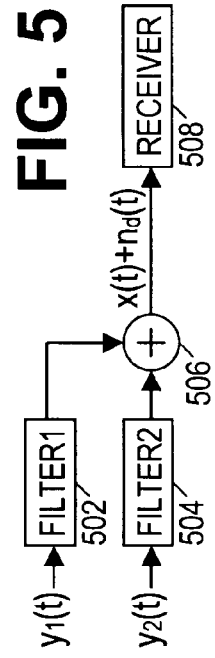
FIG. 5 is a block diagram of an illustrative receiver configuration in accordance with various system embodiments.

FIG. 5 shows a receiver configuration in which a signals from two receivers $y_1(t)$ and $y_2(t)$ are filtered by filter blocks 502 and 504, respectively, before being combined by adder 506. As will be shown, the sum may be a signal in which the surface noise is suppressed. A receiver block 508 receives and demodulates the signal to reconstruct the original telemetry signal u(t). Many suitable equalizers that may be used in receiver block 508, such as a linear equalizer, a fractionally-spaced equalizer, a decision feedback equalizer, and a maximum likelihood sequence estimator. These are described in detail in Chapter 6 (pp. 519–692) of John G. Proakis, *Second Edition Digital Communications*, McGraw-Hill Book Company, New York, (c)1989. Each of the equalizers may be implemented in adaptive form to enhance their performance over a range of variable channel conditions. Filter adaptation is well known and is described in various standard texts such as Simon Haykin, *Adaptive Filter Theory*, Prentice-Hall, Englewood Cliffs, (c)1986.

An examination of FIG. 4 indicates that the surface noise signal may experience many reflections and re-reflections to create a significant number of echoes propagating in both directions. We consider for simplicity the case where first-order wave reflections at the receiver tubing segment ends are taken into account, but the result generalizes when multiple reflections are considered.

Here, $r_t$ and $r_b$ represent reflection coefficients at the top and the bottom of the pipe segment on which the receivers are located. Attenuation is neglected, and delays in the top (AD3 & AD4), middle (AD2 & AD5), and bottom (AD1 & AD6) portions of the pipe segment are $\tau_1$, $\tau_2$, and $\tau_3$, respectively. We consider the received signal expression in the frequency domain:

$$Y_1(f) = (X(f) + N_d(f))(1 + r_t e^{-j2\pi f 2\tau_t}) + N_s(f)(1 + r_b e^{-j2\pi f 2(\tau_m + \tau_b)}) \quad (2)$$

$$Y_2(f) = (X(f) + N_d(f))(e^{-j2\pi f \tau_m} + r_t e^{-j2\pi f(2\tau_t + \tau_m)}) + N_s(f)(e^{-j2\pi f \tau_m} + r_b e^{-j2\pi f(\tau_m + 2\tau_b)}) \quad (3)$$

Equations (2) and (3) can be viewed as a system of two equations with two unknowns: $(X(f)+N_d(f))$ and $N_s(f)$. The system can be solved to eliminate the surface noise:

$$X(f) + N_d(f) = (H_2(f)Y_2(f) - H_1(f)Y_1(f))/D(f) \quad (4)$$

where $$H_1(f) = e^{-j2\pi f \tau_m} + r_b e^{-j2\pi f(\tau_m + 2\tau_b)} \quad (5)$$

$$H_2(f) = 1 + r_b e^{-j2\pi f 2(\tau_m + \tau_b)} \quad (6)$$

$$D(f) = (e^{+j2\pi f \tau_m} + r_t e^{-j2\pi f(2\tau_t + \tau_m)})(1 + r_b e^{-j2\pi f 2(\tau_m + \tau_b)}) - (1 + r_t e^{-j2\pi f 2\tau_t})(e^{-j2\pi f \tau_m} + r_b e^{-j2\pi f(\tau_m + 2\tau_b)}) \quad (7)$$

Thus, appropriate filters for the receive signals $y_1(t)$ and $y_2(t)$ may allow for the complete suppression of the surface noise, even in the presence of multiple reflections. Higher order reflections may be taken into account if desired. Conversely, a simpler implementation may result if reflections are ignored. Consider that in the absence of reflections, the receiver signals may be represented as:

$$y_1(t) = u(t) + d(t + \Delta t) \quad (8)$$

$$y_2(t) = u(t + \Delta t) + d(t) \quad (9)$$

where here u(t) represents an upwardly-propagating signal, d(t) represents a downwardly-propagating signal, and $\Delta t$ represents the propagation delay between the receivers. Then the downwardly-propagating signal may be suppressed with a simple delay and subtraction:

$$y_1(t) - y_2(t + \Delta t) = u(t) + d(t + \Delta t) - u(t + 2\Delta t) - d(t + \Delta t) \quad (10)$$

$$y_1(t) - y_2(t + \Delta t) = u(t) - u(t + 266\ t) \quad (11)$$

The "echo" created by this approach is unlikely to significantly affect the performance of the receiver, while the suppression of the downwardly-propagating signal is expected to greatly enhance the signal to noise ratio of the channel.

As shown above, frequency-domain analysis of continuous signals demonstrates that the array processing with two receivers may perfectly cancel surface noise. In the case of sampled signals, only processing delays which are integer multiples of the sampling interval can be obtained. In general, these digital delays do not correspond to the actual propagation delays. This mismatch between digital and actual propagation delays results in imperfect surface noise cancellation. In order to reduce the error of digital delays, we may approximate fractional delays by allpass filters. Each delay $\tau = nT_s + \delta$ consists of integer multiple of sampling period, $nT_s$, and the fractional delay, $0 \leq \delta < T_s$. The fractional delay $\delta$ can be approximated by the first-order allpass filter $$H_\delta(z) = \frac{a + z^{-1}}{1 + az^{-1}}, \quad \text{where } a = \frac{1 - \delta/T_S}{1 + \delta/T_S} \quad (12)$$

Specifically, terms of the form $e^{-j2\pi f \tau}$ in expressions (5)–(7) may be expressed as $$e^{-j2\pi f_D n} H_\delta(e^{j2\pi f_D}) \quad (13)$$

where $f_D$ denotes digital frequency. The approximation is very accurate at lower frequencies. Better higher order allpass filter fractional delay approximations are given by modified Thiran's design technique, described in J. O. Smith, *Digital Waveguide Modeling of Musical Instruments*, http://www-ccrma.stanford.edu/jos/waveguide, Jun. 8, 2003; and V. Välimäki, *Discrete-Time Modeling of Acoustic Tubes Using Fractional Delay Filters*, PhD thesis, Report no. 37, Helsinki University of Technology, Espoo, Finland, December 1995.

The multi-receiver scheme can be viewed as attenuation of the surface noise. If both the bit and the surface noise are attenuated by some attenuation factors $|G_b(f)|^2$ and $|G_s(f)|^2$ the corresponding capacity expression (in bits/sec) becomes $$C_{UL} = \int_B \log_2\left(1 + \frac{|G_b(f)|^2(f)}{Q(f)}\right) df \text{ bits}/s \quad (14)$$

where $$Q(f) = |G_b(f)|^2 N_b(f) + |G_s(f)|^2 N_s(f) |H(f)|^{-2} \quad (15)$$

It is noted that the disclosed system offers enhanced data transmission rates relative to the rate of existing acoustic telemetry systems. The enhancement is achieved through the suppression of noise or other interference propagating in a direction opposite that of the acoustic signal of interest. Repeaters may also be included along the drill string to extend the signaling range. It is also further noted that the disclosed acoustic telemetry system may operate through continuous (coiled) tubing as well as threaded tubing, and can be employed for both MWD and LWD systems, as well as for production logging using permanently installed sensors, smart-wells, and drill stem testing.

Figure 6:
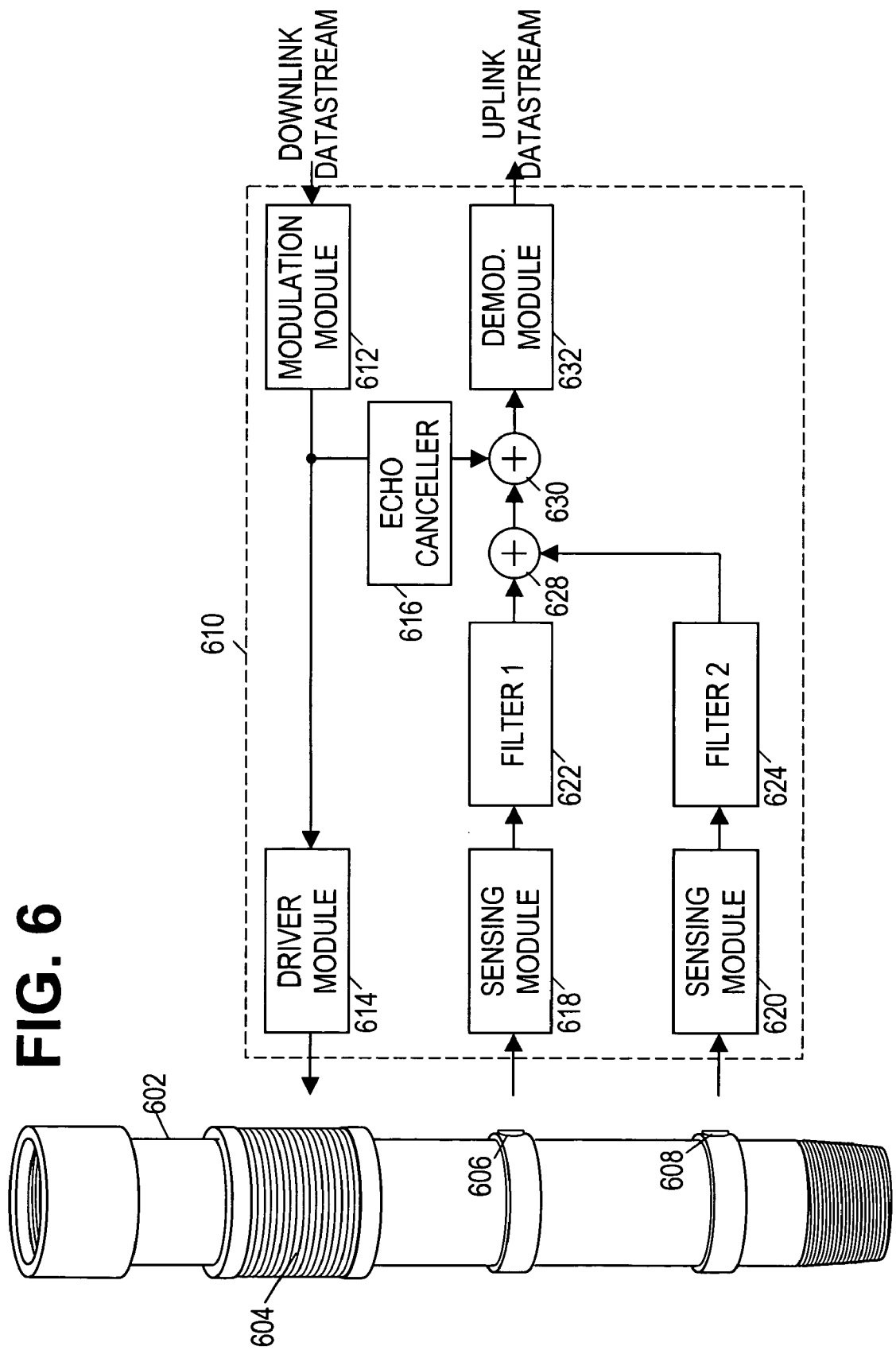
FIG. 6 shows an illustrative transceiver embodiment.

Directional detection may be used in full-duplex systems to enhance performance. FIG. 6 shows an illustrative transmitter/receiver ("transceiver") embodiment 602. Transceiver 602 includes an acoustic transmitter 604, at least two acoustic sensors 606, 608, and transceiver electronics 610. Transceiver electronics 610 may be implemented as one or more application specific integrated circuits (ASICs), or as a digital processor that executes software to perform the various functions described below.

Transceiver electronics 610 include a modulation module 612 configured to convert a downlink datastream into a transmit signal. A driver module 614 amplifies the transmit signal and provides the amplified signal to transmitter 604. (In digital embodiments of electronics 610, the driver module 614 may also provide digital-to-analog conversion.) An echo canceller 616 processes the transmit signal to estimate echoes not otherwise accounted for by the receive chain.

The receive chain in transceiver electronics 610 includes sensing modules 618, 620 that each buffer signals detected by corresponding sensors 606, 608. The sensing modules may be configured to compensate for non-linearities or other imperfections in the sensor responses. Sensing modules 618, 620 may be further configured to provide analog-to-digital signal conversion. The receive signals from the sensor modules are filtered by filters 622, 624, and the filter outputs may be combined by adder 628 to provide directional detection as described previously. Another adder 630 may combine the directional signal from adder 628 with an estimated echo signal from echo canceller 616 to obtain an "echo-cancelled" signal. Demodulator 632 demodulates the echo-cancelled signal to obtain an uplink datastream.

Numerous variations and modifications will become apparent to those skilled in the art once the above disclosure is fully appreciated. For example, the foregoing description was made in the context of a drilling operation, but such acoustic telemetry may also take place through production tubing or any other length of acoustically transmissive material in or out of a borehole. It is intended that the following claims be interpreted to embrace all such variations and modifications.

What is claimed is:

1. An acoustic telemetry device that comprises:
   a first acoustic sensor configured to detect a first communication signal that propagates in a first direction via tubing;
   a second acoustic sensor configured to detect said first communication signal before the first acoustic sensor;
   an electronics module configured to combine signals detected by the first and second acoustic sensors to obtain a combined signal, wherein the combined signal substantially excludes signals that propagate in a second direction opposite said first direction;
   a transmitter configured to transmit a second communication signal that propagates in the second direction via said tubing,
   wherein the electronics module is configured to provide full duplex communication via said tubing, and wherein the electronics module comprises an echo canceller configured to nullify echoes of the second communication signal.

2. The device of claim 1, wherein the tubing is in a borehole.

3. The device of claim 1, further comprising:
   a tubular body configured to connect to said tubing, wherein the first and second acoustic sensors are axially spaced along the tubular body.

4. The device of claim 1, wherein the acoustic sensors are accelerometers.

5. The device of claim 1, wherein the first communication signal is an uplink telemetry signal.

6. The device of claim 1, wherein the first communication signal is a downlink command signal.

7. An acoustic telemetry system that comprises:
   an acoustic transmitter configured to generate acoustic signals that propagate through tubing in a borehole;
   an acoustic sensor array configured to detect acoustic signals that propagate through the tubing;
   a receiver configured to suppress noise associated with acoustic signals originating from one direction relative to the acoustic sensor array and further configured to improve a signal to noise ratio associated with acoustic signals originating from an opposing direction relative to the acoustic sensor array;
   a second acoustic transmitter configured to generate tubing-wall acoustic signals that propagate through the tubing in the opposing direction,
   wherein the receiver is configured to operate contemporaneously with the second acoustic transmitter so as to provide full-duplex communications, wherein the receiver includes an echo canceller to cancel echoes of the acoustic signals sent by the second acoustic transmitter.

8. The system of claim 7, wherein the tubing is a drill string.

9. The system of claim 7, wherein the tubing is a production tubing string.

10. The system of claim 7, wherein the tubing is continuous tubing.

11. An apparatus, comprising:
    an acoustic transmitting device coupled to a drillstring, wherein the acoustic transmitting device is configured to transmit a communication signal along the drillstring in a first direction;
    first and second acoustic receiving devices coupled to the drillstring, wherein the first and second receiving devices are arranged along the drill string such that the first receiving device receives the communication signal before the second receiving device receives the communication signal;
    an electronics module coupled to the drillstring, wherein the electronics module is configured to produce a combined output of the first and second receiving devices such that the combined output excludes substantially all components of a contamination signal in the drillstring and the combined output includes substantially all components of the communication signal.

12. The apparatus of claim 11, wherein the combined output includes one or more versions of the communication signal that propagate along the drillstring in a second direction that is opposite the first direction.

13. The apparatus of claim 11, wherein the drillstring is positioned in a borehole and the contamination signal comes from the surface.

14. The apparatus of claim 13, wherein the communication signal is a telemetry signal.

* * * * *